(12) United States Patent
Chen

(10) Patent No.: US 8,830,865 B2
(45) Date of Patent: *Sep. 9, 2014

(54) ADAPTIVE PACKET SIZE MODIFICATION FOR PACKET NETWORKS

(71) Applicant: Broadcom Corporation, Irvine, CA (US)

(72) Inventor: Juin-Hwey Chen, Irvine, CA (US)

(73) Assignee: Broadcom Corporation, Irvine, CA (US)

( * ) Notice: Subject to any disclaimer, the term of this patent is extended or adjusted under 35 U.S.C. 154(b) by 0 days.

This patent is subject to a terminal disclaimer.

(21) Appl. No.: 13/754,313

(22) Filed: Jan. 30, 2013

(65) Prior Publication Data

US 2013/0142037 A1 Jun. 6, 2013

Related U.S. Application Data

(63) Continuation of application No. 11/520,085, filed on Sep. 13, 2006, now Pat. No. 8,391,166.

(51) Int. Cl.
*H04L 12/26* (2006.01)
*H04L 12/56* (2006.01)
*H04W 28/06* (2009.01)

(52) U.S. Cl.
CPC ............. *H04L 47/365* (2013.01); *H04W 28/06* (2013.01)
USPC .......................................... 370/252; 370/474

(58) Field of Classification Search
CPC ...... H04L 47/36; H04L 47/365; H04W 28/06
USPC .................. 370/252, 253, 468, 474
See application file for complete search history.

(56) References Cited

U.S. PATENT DOCUMENTS

| | | | |
|---|---|---|---|
| 5,425,051 | A | 6/1995 | Mahany |
| 6,421,720 | B2 * | 7/2002 | Fitzgerald ..................... 709/224 |
| 6,477,143 | B1 | 11/2002 | Ginossar |
| 6,477,164 | B1 | 11/2002 | Vargo et al. |
| 6,621,793 | B2 | 9/2003 | Widegren et al. |
| 7,609,747 | B2 | 10/2009 | Mahany |
| 8,391,166 | B2 | 3/2013 | Chen |

(Continued)

FOREIGN PATENT DOCUMENTS

| | | | |
|---|---|---|---|
| EP | 0254047 | A2 | 1/1988 |
| EP | 0942560 | A2 | 9/1999 |
| EP | 1178635 | A1 | 2/2002 |
| EP | 1372300 | A1 | 12/2003 |

OTHER PUBLICATIONS

European Search Report received for European Patent Application No. 07006996.8, mailed on Jan. 14, 2008, 3 pages.

*Primary Examiner* — Pao Sinkantarakorn
(74) *Attorney, Agent, or Firm* — Fiala & Weaver P.L.L.C.

(57) ABSTRACT

A system and method for modifying the size of data packets transmitted over a packet network in a manner that avoids overloading of the network. The system and method involves monitoring one or more parameters indicative of an amount of bandwidth being utilized on the packet network, responsive to the monitoring, determining that a level of bandwidth utilization on the packet network has changed, responsive to the determination that the level of bandwidth utilization on the packet network has changed, issuing a command to change the size of packets used for carrying data from a first packet size to a second packet size.

20 Claims, 6 Drawing Sheets

(56) References Cited

U.S. PATENT DOCUMENTS

| | | |
|---|---|---|
| 2001/0023454 A1 | 9/2001 | Fitzgerald |
| 2002/0110112 A1 | 8/2002 | Tuomi |
| 2003/0091017 A1* | 5/2003 | Davenport et al. ........... 370/338 |
| 2003/0093563 A1 | 5/2003 | Young et al. |
| 2006/0067324 A1 | 3/2006 | Kim et al. |
| 2008/0031229 A1 | 2/2008 | Michelson et al. |
| 2010/0246430 A1* | 9/2010 | Egan et al. .................... 370/252 |

* cited by examiner

# ADAPTIVE PACKET SIZE MODIFICATION FOR PACKET NETWORKS

RELATED APPLICATIONS

This application is a continuation of U.S. Non-Provisional patent application Ser. No. 11/520,085, filed Sep. 13, 2006, which is incorporated by reference herein in its entirety.

FEDERALLY SPONSORED RESEARCH OR DEVELOPMENT

[Not Applicable]

MICROFICHE/COPYRIGHT REFERENCE

[Not Applicable]

BACKGROUND OF THE INVENTION

In audio coding (sometimes called "audio compression"), a coder encodes an input audio signal into a compressed digital bit stream for transmission or storage, and a decoder decodes the transmitted or stored bit stream into an output audio signal. The combination of the coder and the decoder is called a codec. The input audio signal is typically partitioned into segments called "frames" and the coder encodes each frame to produce a compressed bit stream that represents the frame. As used herein, the term "frame" may alternately be used to refer to a segment of the input audio signal or the compressed bit stream that represents such a segment.

In a voice over packet network, such as a Voice over Internet Protocol (VoIP) network, frames of encoded voice signals must be encapsulated within the payload of one or more packets prior to transmission. Most conventional speech coders that packetize encoded voice signals do not allow a single frame to be split across multiple packets. In fact, the well-known Real-time Transport Protocol (RTP) standard—an Internet Engineering Task Force (IETF) standard that defines a protocol for delivering audio and video over the Internet—specifically discourages the splitting of frames across multiple packets. This is because most speech decoders require an entire frame of encoded voice data to be present to successfully perform a decoding operation. Thus, if a frame was split across multiple packets and one of the multiple packets was lost during transmission (or delayed long enough so as to be deemed lost), most conventional decoders would be unable to use the remaining packets even if they were received successfully. Thus it can be seen that allowing frames to be split across multiple packets has the effect of increasing the packet loss rate of a communication system.

A fundamental deficiency of voice over packet networks is that the end-to-end delay or latency associated with a telephone call is inevitably higher than that of conventional circuit-switched networks. In part, this is because a circuit-switched network can perform sample-by-sample transmission of voice signals. That is to say, in a circuit-switched network, each sample of input speech is encoded into a small number of bits (e.g., 8 bits) using a technique such as pulse code modulation (PCM) and then the bits are immediately transmitted over the network. In contrast, as described above, in a voice over packet network, at least one entire frame of encoded voice signals must be collected and packetized before transmission can occur. For example, a coder in a voice over packet network that encodes 8 kHz-sampled speech at a bit rate of 16 kilobits/second (kbit/s) with a 20 millisecond (ms) frame size must collect and packetize at least 40 bytes of encoded data before transmission can occur.

Achieving low end-to-end delay is important for two-way communications because if the delay becomes too long, call quality will suffer. For example, any acoustic or electric echo associated with an end-to-end connection will become more noticeable as delay increases. This is because the longer the echo is delayed, the easier the ear can detect it. In order to address this problem, echo cancellers that are capable of providing increased echo attenuation are typically used. This, in turn, increases the cost and complexity of the telephony devices used for voice communication. Significant delays, such as delays that are 150 ms. or longer, can cause real problems in terms of interaction between participants in a phone conversation, causing each participant to talk over the other one and also to miss what the other participant is saying.

As noted above, a coder in a voice over packet network must accumulate and packetize at least one frame's worth of encoded voice signals prior to transmission. Most conventional low bit-rate codecs (i.e., codecs that operate at the rate of 2 bits per sample or lower) use at least a 10 ms frame size. For example, G.729 codecs use a 10 ms. frame size. Many other conventional low bit-rate codecs use a frame size as large as 20 ms. or 30 ms.

One way of reducing the delay associated with voice over packet communication is to reduce the frame size, thereby decreasing the amount of encoded data that must be accumulated and packetized prior to transmission. BroadVoice™ is a speech codec family developed by Broadcom Corporation of Irvine Calif. for VoIP applications, including Voice over Cable, Voice over DSL, and IP phone applications. The BroadVoice™ codec family contains two codec versions. The narrowband version of BroadVoice™, called BroadVoice16, or BV16 for short, encodes 8 kHz-sampled narrowband speech at a bit rate of 16 kbit/s. The wideband version of BroadVoice™ called BroadVoice32, or BV32, encodes 16 kHz-sampled wideband speech at a bit rate of 32 kbit/s. To minimize the delay in real-time two-way communications, both BV16 and BV32 encode speech with a very small frame size of 5 ms. This allows VoIP systems based on BroadVoice™ to have a very low end-to-end system delay, by using a packet size as small as 5 ms if necessary. For example, by using a 5 ms packet size, a VoIP system based on BV16 can transmit a packet after encoding and packetizing only 10 bytes of data and a VoIP system based on BV32 can transmit a packet after encoding and packetizing only 20 bytes of data.

However, one drawback associated with using a small frame and packet size for transmitting encoded voice signals is that the packet payload will be relatively small compared with the packet header. Many VoIP networks use a combination of Real Time Protocol (RTP), User Datagram Protocol (UDP) and Internet Protocol (IP) to transport voice packets over the Internet. For RTP/UDP/IPv4, the packet header length typically amounts to 40 bytes, while for RTP/UDP/IPv6, the header length typically amounts to 60 bytes. As discussed above, a system based on BV32 can transmit packets having only a 20-byte payload, while a system based on BV16 can generate packets having only a 10-byte payload. Thus, a system using RTP/UDP/IP and BV32 with a frame/packet size of 5 ms would transmit packets in which the header is two to three times the size of the payload and a system using RTP/UDP/IP and BV16 with a frame/packet size of 5 ms would transmit packets in which the header is four to six times the size of the payload. The net effect of transmitting packets having such a disproportionately large header is that the effective bit rate of the system is substantially decreased. Stated another way, the net effect is that a large amount of transmission bandwidth is "wasted" transporting packet header information rather than encoded speech. This is highly undesirable, particularly when the network is heavily loaded and transmission bandwidth is limited.

One way of reducing the overhead of large packet headers is to implement a packet header compression scheme, a variety of which are known in the art. Generally speaking, packet header compression works by suppressing selected packet header fields in a series of packets communicated from a transmitting device to a receiving device. The selected packet header fields are typically non-varying or vary in some predictable way such that they can be reconstructed by the receiving device based on "learned" initial values for those fields. However, it is not always feasible to implement packet header compression in a communication system. For example, because implementing a packet header compression protocol requires special logic to be installed at every communication end-point, it may be simply too expensive or inconvenient too deploy.

Another method of reducing the overhead of large packet headers is to place a greater amount of encoded speech in each voice packet when network congestion increases. One example of such a system described in U.S. Pat. No. 6,421,720 entitled "Codec-Independent Technique for Modulating Bandwidth In Packet Network" issued to C. W. Fitzgerald. Fitzgerald discloses modifying the amount of encoded speech information in each transmitted packet based upon the use of end-to-end packet delay over the path carrying the voice packets as a measure of network congestion.

Further limitations and disadvantages of conventional and traditional approaches will become apparent to one of skill in the art, through comparison of such systems with the present invention as set forth in the remainder of the present application with reference to the drawings.

BRIEF SUMMARY OF THE INVENTION

A system and/or method for adaptively modifying voice packet size based upon packet network loading, substantially as shown in and/or described in connection with at least one of the figures, as set forth more completely in the claims.

These and other advantages and novel features of the present invention, as well as details of an illustrated embodiment thereof will be more fully understood from the following description and drawings.

DETAILED DESCRIPTION OF THE INVENTION

Figure 1:
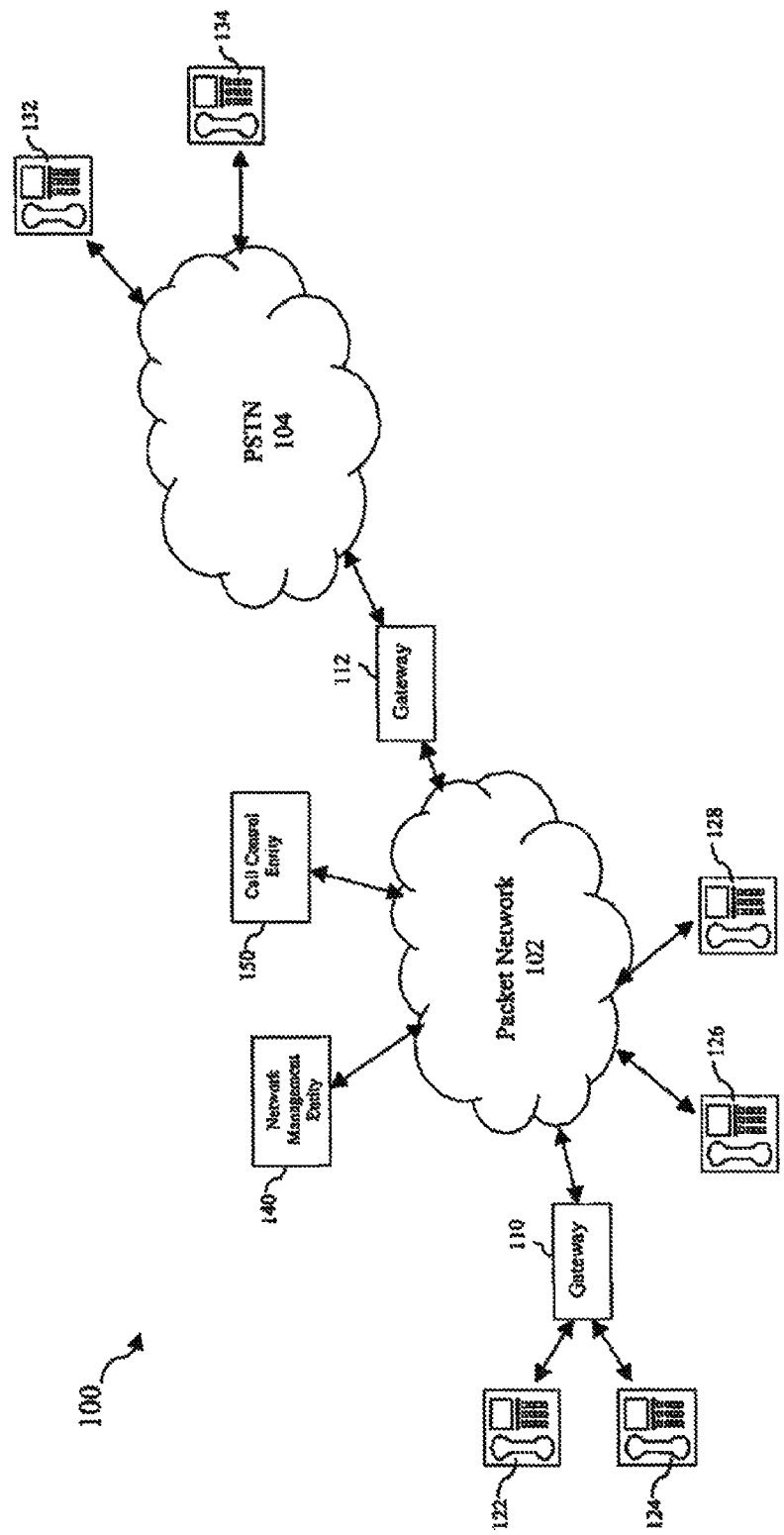
FIG. 1 illustrates an exemplary Voice over Internet Protocol (VoIP) telephony system in which an embodiment of the present invention may be implemented.

Aspects of the present invention relate to the transmission of voice information over a packet switched network. More specifically, certain aspects of the present invention relate to a system and method for selecting the size of packets used for the transmission of digital voice information based upon the currently level of network traffic, in order to use relatively shorter voice packets when network loading is light, and use relatively longer packet sizes when network loading is heavier. Embodiments of a system and method in accordance with the present invention enable reduction of the end-to-end delay associated with telephone calls placed over a voice over packet network, such as a VoIP network, and the use of a small frame size and packet size for transmitting voice packets over the network, without resulting in overloading of the network or requiring increased network capacity.

The following detailed description of the present invention refers to the accompanying drawings that illustrate exemplary embodiments consistent with this invention. Other embodiments are possible, and modifications may be made to the embodiments within the spirit and scope of the present invention. It should be noted that although most of the discussion contained herein refers to the handling of voice packets, aspects of the present invention may be employed with other forms of real-time communication over a packet network including, for example, packetized video and multimedia information (e.g., voice and video, combined). Therefore, the following detailed description is not meant to limit the invention. Rather, the scope of the invention is defined by the appended claims.

It would be apparent to persons skilled in the art that the present invention, as described below, may be implemented in many different embodiments of hardware, software, firmware, and/or the entities illustrated in the drawings. Any actual software code with specialized control hardware to implement the present invention is not limiting of the present invention. Thus, the operation and behavior of the present invention will be described with the understanding that modifications and variations of the embodiments are possible, given the level of detail presented herein.

FIG. 1 illustrates an exemplary Voice over Internet Protocol (VoIP) telephony system 100 in which an embodiment of the present invention may be implemented. It should be noted, however, that the present invention is not limited to VoIP telephony systems and may in fact be implemented in any telephony system in which real-time information such as voice signals are encoded and transmitted in packets (as in the case of voice signals, generally referred to herein as "voice over packet" systems).

As shown in the example of FIG. 1, VoIP telephony system 100 supports communication between and among telephones 122, 124, 126, 128, 132 and 134. Telephones 132 and 134 represent POTS (plain old telephone service) or "conventional" telephones that are adapted for communication over a Public Switched Telephone Network (PSTN) 104 using conventional circuit-switched technology. In contrast, telephones 126 and 128 represent VoIP telephones that are adapted to send and receive voice data in packet form over a packet network 102 utilizing packet-switching technology. In some representative embodiments of the present invention, packet network 102 may employ an Internet protocol (IP) for transmission of packets. Packet network 102 may comprise for example a local area network and/or a wide area network such as the Internet. Telephones 122 and 124 represent telephones that are not adapted for IP-based communication and thus are connected to packet network 102 by a gateway 110 that performs necessary functions to convert between a protocol supported by telephones 122 and 124 and the IP-based protocol supported by packet network 102.

For example, in one representative embodiment, telephones 122 and 124 may represent standard POTS telephones that transmit and receive analog voice signals to and from gateway 110. In accordance with such an implementation, gateway 110 may be configured to digitize, encode and encapsulate in packet form analog voice signals received from telephones 122 and 124 for transmission over packet network 102. Gateway 110 may also be configured to receive packets from packet network 102, extract digital voice signals therefrom, decode the digital voice signals and convert them into analog form for transmission to telephones 122 and 124.

As shown in FIG. 1, the VoIP telephony system 100 also includes a gateway 112 that resides between packet network 102 and PSTN 104. The gateway 112 may perform functions to convert between the different protocols supported by those networks. Thus, for example, gateway 112 may be configured to receive analog or digital voice signals from PSTN 104 and to encapsulate them into IP packets for transmission over packet network 102. Likewise, gateway 112 may be configured to receive IP packets from packet network 102 and to extract analog or digital voice signals therefrom for transmission over PSTN 104. In one representative embodiment of the present invention, the elements of the VoIP telephony system 100 may operate according to the International Telecommunication Union (ITU) H.323 recommendation.

As further shown in FIG. 1, VoIP telephony system 100 may include a network management entity 140 and a call control entity 150 communicatively connected to packet network 102. Network management entity 140 may perform one or more network management functions such as monitoring and configuring of hardware components and software components of packet network 102, bandwidth management, configuration of subscribers and subscriber services, billing and associated record-keeping, or the like. As will be described in more detail below, at a minimum network management entity 140 may provide and/or monitor one or more parameters indicative of an amount of bandwidth being utilized by packet network 102.

In a representative embodiment of the present invention, call control entity 150 may provide call logic and call control functions for the management and maintenance of call state for one or more calls in packet network 102. Call control entity 150 may include service logic for providing supplementary services such as Caller ID, Call Waiting, and may also interact with application servers (not shown in FIG. 1) to supply services that are not directly supported by call control entity 150. In one representative embodiment, call control entity 150 may participate in signaling and device control flows originating, terminating or forwarding messages. Depending upon the architecture of VoIP telephony system 100, call control entity 150 may be implemented as a Call Agent (also known as Media Gateway Controllers, Soft-switches, and Call Controllers), a SIP Server or a SIP Client. However, these examples are not limiting, and other implementations are also possible.

It will be understood by persons skilled in the art that, given the wide variety of VoIP implementations, the functions performed by network management entity 140 and call control entity 150 may be implemented in a single network component or device, or across several components or devices. Moreover, the functions may be implemented in hardware, software, or as a combination of hardware or software. Furthermore, it is to be understood that the connections shown in FIG. 1 may be implemented as wired connections, wireless connections, or a combination of wired and wireless connections. In some representative embodiments of the present invention, the call control entity 150 and the network management entity 140 may perform functions similar in many ways to that defined for an ITU H.323 "Gatekeeper".

In a representative embodiment of the present invention, entities such as the network management entity 140 or the call control entity 150 of FIG. 1, for example, may collect and analyze bandwidth utilization information gathered from a number of network entities such as the gateways 110, 112 and/or VoIP telephones 126, 128, to determine current network bandwidth utilization and congestion. The network management entity 140 may then determine that end-to-end delay for active voice calls may be reduced by increasing the amount of voice data in each voice packet. In comparison to prior art approaches, a representative embodiment of the present invention is able to take into account overall network utilization and load, as opposed to measurement of the end-to-end delay over an individual call path, as is employed in prior art approaches. Although end-to-end delay over a call path may be used to adjust packetization of real-time media streams, the use of more comprehensive and coordinated measurements and control as described herein by a representative embodiment of the present invention, provide a more reliable and accurate assessment of, and compensation for, overall network bandwidth use and network congestion.

In a representative embodiment of the present invention, a network entity such as, for example, the network management entity 140 and/or the call control entity 150 may periodically request status information from other network entities such as the gateways 110, 112 and/or the VoIP telephones 126, 128. This status information may comprise parameters such as the requested bandwidth for each active call and/or the current measured bandwidth in use for each active call. Bandwidth may be measured in terms of bits per second or packets per second, to name only two possible examples. In a representative embodiment of the present invention, a network entity such as the network management entity 140 or call control entity 150 may analyze the information gathered from network entities, and may determine whether to send to one, a selected portion, or all of the entities currently serving active calls, messaging requesting that bandwidth use be reduced, or allowing increased bandwidth use. A network entity such as the network management entity 140 and/or call control entity 150 may also use the collected information about network utilization to act in a "gatekeeper" role, to set bandwidth limits for new calls as the calls are initiated.

Upon receiving messaging about allowed bandwidth use, network entities in a representative embodiment of the present invention may adjust the amount of encoded voice data placed in each outgoing voice packet. Some representative embodiments of the present invention may accomplish this by continuing the use of the current encoding algorithms, and adjusting the number of voice frames in each voice packet either up or down, depending upon whether bandwidth use is relaxed or restricted. In other representative embodiments of the present invention, a different algorithm may be selected to encode the voice information for transmission. For example, an encoding algorithm having a higher rate of compression and/or larger frame size may be employed when network bandwidth utilization (i.e., congestion) is relatively higher, and an encoding algorithm having a lower rate of compression and/or smaller frame size may be used when network bandwidth utilization is relatively lower. The encoding algorithm to be used may be selected from those defined by any of the available standards or according to any proprietary encoding algorithm, as described herein.

To avoid excessive messaging and processing at network entities, a representative embodiment of the present invention may employ one or more thresholds to determine when adjustments in bandwidth use and/or encoder algorithms are to be made. In order to avoid creating excessive end-to-end path delays, a representative embodiment of the present invention may adjust packetization in accordance with parameters that allow the system operator to place weights or limits on the importance of various measures including, for example, voice quality, end-to-end delay, and network bandwidth utilization, to name only three. A representative embodiment of the present invention may also use system operator defined or historical data about past network usage in terms of time of day, day of the week, holiday period, etc., to adjust operating parameters and algorithm behavior. Again, it should be noted that although a representative embodiment of the present invention is described herein primarily in terms of the handling of voice information, voice frames, voice encoding, and the assembly of voice packets, the techniques disclose herein may be applied to other real-time media streams such as video and multimedia, as well.

In some representative embodiments of the present invention, a separate network entity such as the network management entity 140 or the call control entity 150 may not be present. In such situations, a network entity such as the gateway 110 or the VoIP telephone 126 may perform functions of the network management entity 140 and the call control entity 150 such as, for example, the gathering and analysis of network bandwidth use described above. In such an arrangement, a VoIP telephone such as the VoIP telephone 126 may, for example, request status information such as a bandwidth allocation or utilization from other network entities, and may use the gathered information and parameters described herein to determine the behavior of encoding and packetization algorithms used in processing voice data. In a representative embodiment of the present invention, the setting of packet sizes and encoding algorithms used may be determined and shared by one gateway or VoIP telephone with another on a call path, without the need for a stand-alone network management entity or a call control entity like those shown in FIG. 1.

Figure 2A:
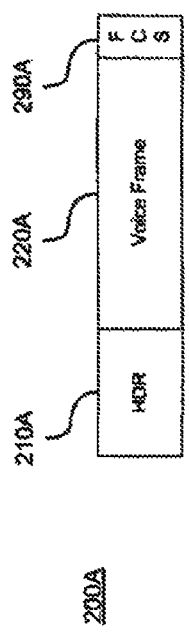
FIG. 2A illustrates an exemplary voice packet containing a single voice frame that may be employed in a representative embodiment of the present invention.

FIG. 2A illustrates an exemplary voice packet 200A containing a single voice frame 220A, that may be employed in a representative embodiment of the present invention. In the simplified example of FIG. 2A, the voice packet 200A comprises a header portion (HDR) 210A that may, for example, contain source and/or destination addressing information, packet sequence numbering information, and control information. Depending upon the protocol used in the packet network 102 and the protocol options selected, other information elements may also be present in HDR 210A. The voice packet 200A of FIG. 2A also comprises a frame check sequence (FCS) 290A that may be used to detect and/or correct errors that occur in the information in the voice frame 220A and/or header portion 210A due to corruption during transmission.

The voice frame 220A portion of the voice packet 200A may comprise voice information digitized according to any of a number of different standards-based or proprietary voice encoding algorithms including those employing compression such as, for example, A-law, μ-law, G.729, G.731, enhanced variable-rate coding (EVRC), code excited linear predictive (CELP), algebraic code excited linear prediction (ACELP), adaptive multi-rate (AMR), to name only a few.

Figure 2B:
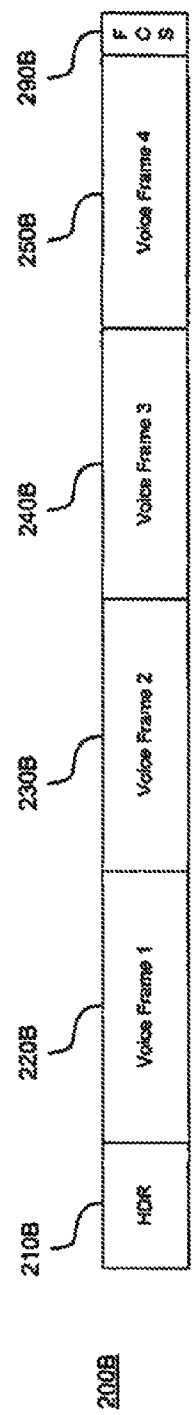
FIG. 2B illustrates an exemplary voice packet containing voice frames 1, 2, 3 and 4 that may be employed in a representative embodiment of the present invention.

FIG. 2B illustrates an exemplary voice packet 200B containing voice frames 1 220B, 2 230B, 3 240B and 4 250B that may be employed in a representative embodiment of the present invention. Although the example of FIG. 2B shows four voice frames 1 220B, 2 230B, 3 240B and 4 250B in the voice packet 200B, in a representative embodiment of the present invention, a greater or lesser number of voice frames may be assembled into a voice packet. In the same manner as the voice packet 200A of FIG. 2A, the voice packet 200B of FIG. 2B comprises a header portion (HDR) 210B that may, for example, contain source and/or destination addressing information, packet sequence numbering information, control information, and the like. The voice packet 200B of FIG. 2B also comprises a frame check sequence (FCS) 290B that may be used to detect and/or correct errors that occur in the information in the voice frames 1 220B, 2 230B, 3 240B and 4 250B, and/or header portion 210B due to corruption during transmission. As in the example of FIG. 1, voice frames 1 (220B), 2 (230B), 3 (240B) and 4 (250B) in the voice packet 200B may comprise voice information digitized according to any available proprietary or standards-based voice encoding algorithms, including those mentioned above.

Figure 3:
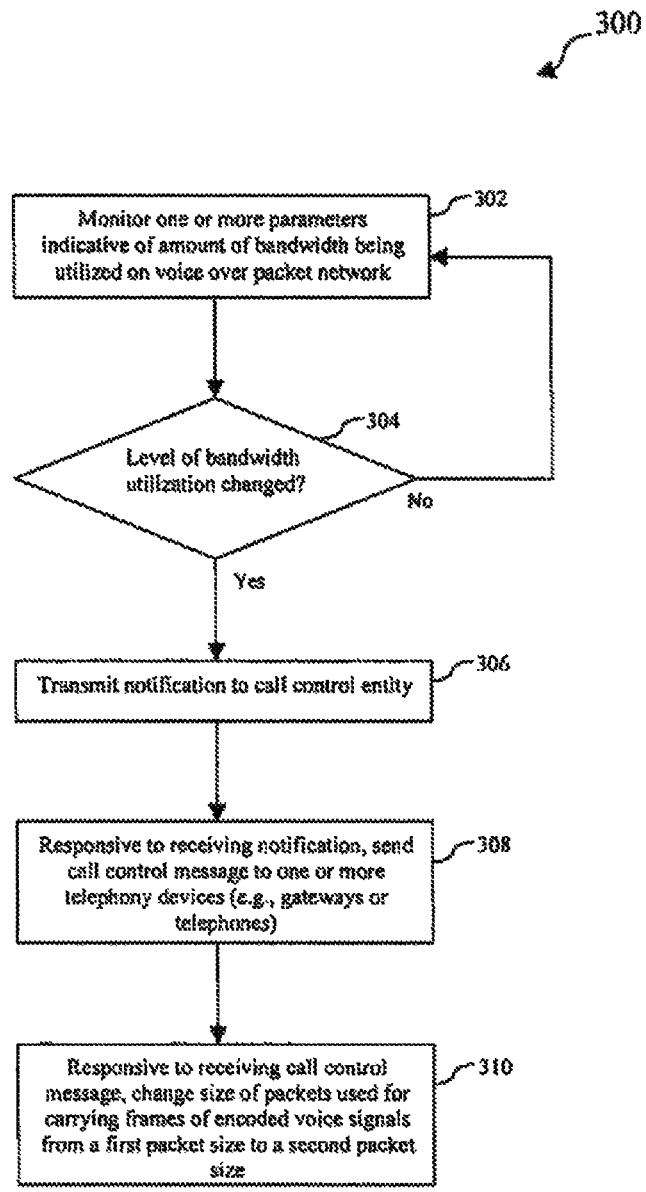
FIG. 3 illustrates a flowchart of an exemplary method for reducing end-to-end delay associated with telephone calls carried over a voice over packet network in a manner that avoids overloading of a network, in accordance with a representative embodiment of the present invention.

FIG. 3 illustrates a flowchart 300 of an exemplary method for reducing end-to-end delay associated with telephone calls carried over a voice over packet network in a manner that avoids overloading of a network, in accordance with a representative embodiment of the present invention. The method of flowchart 300 will now be described with reference to the exemplary VoIP telephony system 100 described above in reference to FIG. 1. However, persons skilled in the relevant art will readily appreciated that the invention may be implemented in any voice over packet system.

The method of flowchart 300 begins at step 302, in which network management entity 140 monitors one or more parameters that are indicative of the amount of bandwidth currently being utilized on packet network 102. For example, network management entity 140 may monitor parameters such as an amount of traffic being handled by network elements (such as routers and servers) or a number of active calls being handled by call control entity 150 in order to ascertain the level of bandwidth usage. In the alternative, it may be evident from a historical perspective that during certain times of day (e.g., evenings) and certain days of the week (e.g., weekends), bandwidth utilization on packet network 102 is significantly less than at other times (e.g., weekdays during business hours). Thus, in one representative embodiment of the present invention, network management entity 140 may monitor what the time of day is and/or what day of the week it is in order to obtain an indication of the amount of bandwidth currently being utilized on packet network 102. However, these examples are not intended to be limiting, and a variety of other parameters may be monitored that are indicative of the amount of bandwidth currently being utilized on packet network 102 as will be appreciated by persons skilled in the art.

At step 304, a network entity such as, for example, the network management entity 140 may determine whether or not the level of bandwidth utilization has changed based on the monitored parameters. For example, network management entity 140 may determine that the level of bandwidth utilization has decreased or increased based on a change in the amount of traffic being handled by network elements or a change in the number of active calls being handled by call control entity 150. In another representative embodiment of the present invention, network management entity 140 may determine that the level of bandwidth utilization has decreased or increased based on reaching a certain time of day or day of the week. As noted above, other parameters may be monitored to make this determination as will be appreciated by persons skilled in the art.

Determining whether or not the level of bandwidth utilization has changed may include determining whether or not the level of bandwidth utilization has increased or decreased by a predetermined amount, or whether or not the level of bandwidth utilization exceeds or drops below a predetermined threshold. For example, the determination may be based on an assessment that bandwidth utilization currently exceeds or has dropped below a certain percentage of total network capacity. Such predetermined amounts and thresholds may be parameters that are adjustable by an operator of a network such as the VoIP telephony system 100 of FIG. 1, for example.

If it is determined in step 304 that the level of bandwidth utilization has not changed, then network management entity 140 may continue to monitor the one or more parameters indicative of an amount of bandwidth being utilized on packet network 102 as shown by the arrow returning from step 304 to step 302. However, if it is determined in step 304 that the level of bandwidth utilization has changed, then network management entity 140 may send a notification to call control entity 150 as shown at step 306.

At step 308, responsive to receiving the notification, call control entity 150 may send a call control message to one or more telephony devices communicatively connected to packet network 102. The telephony devices referred to in this step comprise those devices communicatively connected to packet network 102 that are responsible for packetizing frames of encoded voice signals for transport over the network. For example, with reference to FIG. 1, call control entity 150 may send a call control message to one or more of VoIP telephone 126, VoIP telephone 128, gateway 110 and gateway 112. In a representative embodiment of the present invention, call control entity 150 may send a call control message to each telephony device with which it is associated for the purposes of maintaining call state, although this example is not intended to be limiting.

At step 310, responsive to receiving a call control message, each telephony device receiving the message may change the size of packets used for carrying frames of encoded voice signals from a first packet size to a second packet size. For example, in one representative embodiment, when the call control message has been generated due to a detected decrease in the level of bandwidth utilization, each telephony device receiving the call control message reduces the size of packets used for carrying frames of encoded voice signals. This change may comprise, for example, reducing the number of frames that can be carried by a packet such that instead of carrying a payload of 10, 20 or 30 milliseconds of encoded voice signals, a packet carries a payload of only 5 milliseconds of encoded voice signals. However, this example is not limiting, and other payload size reductions may be used as will be appreciated by persons skilled in the art. For example, a representative embodiment of the present invention may instead or in combination, change the choice of encoding algorithm used to encode voice signals.

By reducing the packet size in this manner, a representative embodiment of the present invention decreases the amount of encoded data that must be accumulated and packetized prior to transmission over packet network 102, which in turn reduces the end-to-end delay associated with a VoIP telephone call. However, as noted above, reducing the packet size in this manner may result in packets having disproportionately large headers, such that a large amount of transmission bandwidth is consumed or "wasted" transporting packet header information rather than encoded speech. A representative embodiment of the present invention addresses this issue by only reducing the packet size when bandwidth utilization on packet network 102 is determined to have decreased by a certain amount or to a particular level, such that this consumption of transmission bandwidth can be readily accommodated by the network. The amount of decrease or level or bandwidth utilization may be a parameter used in the management of the behavior of a packet communication system such as, for example, the VoIP telephony system 100 of FIG. 1.

In another representative embodiment, at step 310, when the call control message has been generated due to a detected increase in the level of bandwidth utilization, each telephony device receiving the call control message may increase the size of packets used for carrying frames of encoded voice signals. This change may comprise, for example, increasing the number of frames that can be carried by a packet such that instead of carrying a payload of only 5 milliseconds of encoded voice signals, a packet carries a payload of 10, 20 or 30 milliseconds of encoded voice signals. However, this example is not limiting, and other payload size increases may be used as will be appreciated by persons skilled in the art.

By increasing the packet size in this manner, a representative embodiment of the present invention avoids generating packets with disproportionately large headers, such that a large amount of transmission bandwidth is not "wasted" transporting packet header information rather than encoded speech. However, as noted above, increasing the packet size in this manner increases the amount of encoded data to be accumulated prior to packetization and transmission over packet network 102, which in turn may increase the end-to-end delay associated with a VoIP telephone call. A representative embodiment of the present invention addresses this issue by only increasing packet size when bandwidth utilization on packet network 102 is determined to have increased by a certain amount or to a particular level, such that avoiding unnecessary consumption of transmission bandwidth is deemed a greater priority than preventing an increase of the end-to-end delay for VoIP telephone calls. The amount of the increase in bandwidth utilization and/or the particular level of bandwidth utilization at which a change in packet size is made may, for example, be a parameter adjustable by a system operator.

Although the present invention has been described with respect to the exemplary VoIP telephony system 100 of FIG. 1 and flowchart 300 of FIG. 3, persons skilled in the relevant art will appreciate that the present invention is not limited to those implementations. For example, although VoIP telephony system 100 is shown as including only a single packet network 102, persons skilled in the art will appreciate that a VoIP telephony system may include multiple packet networks and that the present invention may be practiced by monitoring bandwidth utilization across one or more of the multiple packet networks using one or more network management entities. It will also be appreciated that the techniques and methods described herein apply equally well to other forms of real-time media such as, for example, video and multimedia information.

Furthermore, as described above, a representative embodiment of the present invention operates by using a reduced packet size for a VoIP telephone call during periods of low network bandwidth utilization and using an increased packet size during periods of high network bandwidth utilization. The commands and logic necessary to increase or reduce the packet size within a given telephony device will be dependent upon the protocols being used. In one representative embodiment of the present invention, it may be necessary to send a call control command to two end-points on the packet network in order to change the packet size being used. In another representative embodiment, it may be necessary to send a call control command to only one end-point.

In the method of flowchart 300 described above in reference to FIG. 3, network management entity 140 automatically monitors one or more parameters that are indicative of an amount of bandwidth being used on packet network 102. However, in an alternative embodiment of the present invention, network management entity 140 merely provides the one or more parameters to a system administrator. The system administrator may monitor the one or more parameters and may then determine whether the level of bandwidth utilization has changed. If the system administrator determines that the level of bandwidth utilization has changed, then the system administrator may cause a notification to be transmitted to call control entity 150. After transmission of the notification, the functions of step 308 and step 310 may occur as described above with reference to FIG. 3.

Also, in the method of flowchart 300, network management entity 140 may send a notification to call control entity 150 when a change in bandwidth utilization has been detected. In another representative embodiment of the present invention, network management entity 140 does not send a notification to call control entity 150 as described in reference to step 306 of FIG. 3, but instead sends a call control message directly to one or more telephony devices. After sending the call control message(s), the functions of step 310 may occur as described above with reference to FIG. 3.

Figure 4:
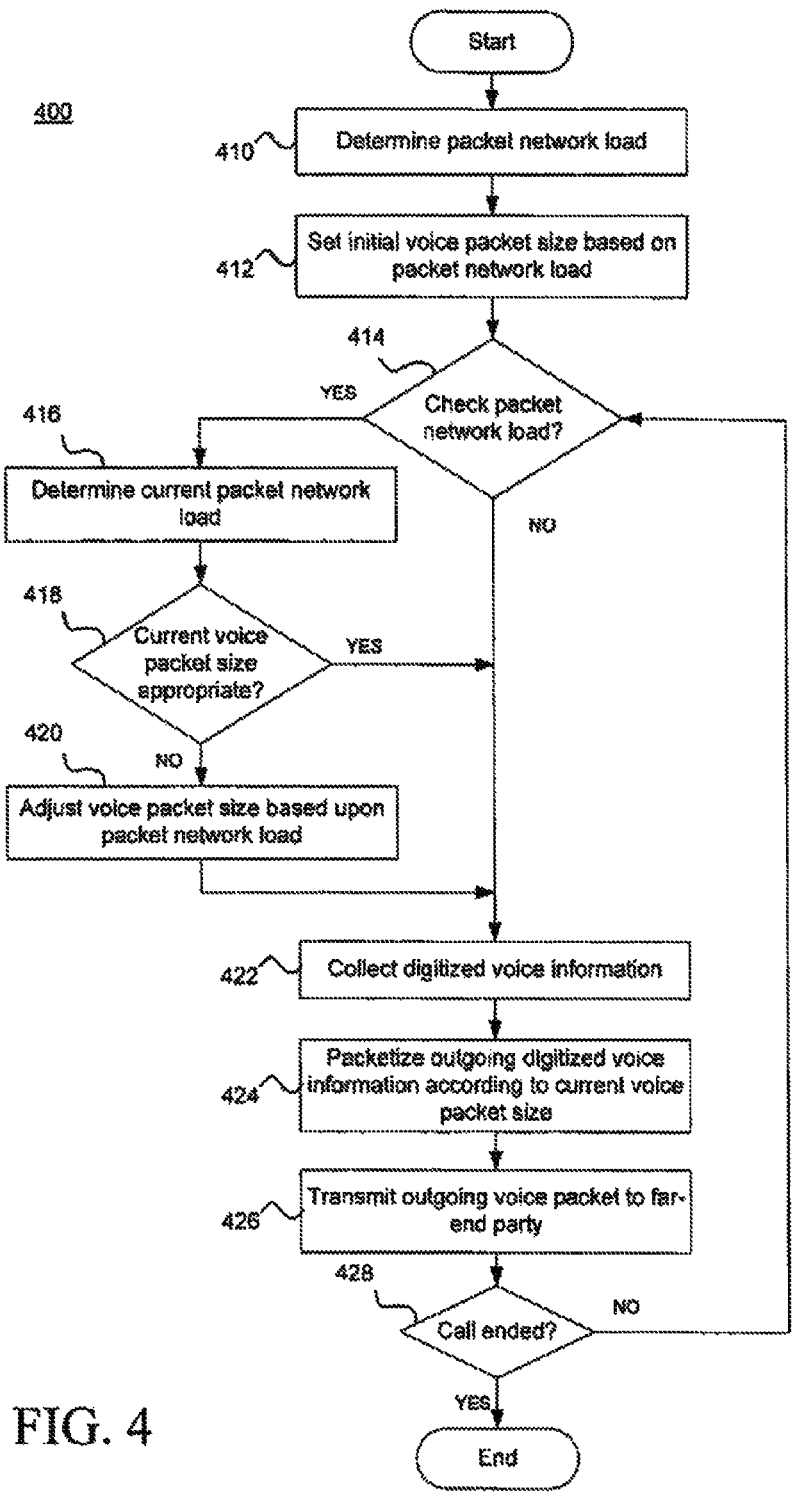
FIG. 4 illustrates a flowchart of an exemplary method of operating a voice packet terminal such as, for example, the VoIP telephones of FIG. 1 for reducing end-to-end delay associated with telephone calls carried over a voice over packet network in a manner that avoids overloading of a network, in accordance with a representative embodiment of the present invention.

FIG. 4 illustrates a flowchart 400 of an exemplary method of operating a voice packet terminal such as, for example, the VoIP telephones 126, 128 of FIG. 1 for reducing end-to-end delay associated with telephone calls carried over a voice over packet network in a manner that avoids overloading of a network, in accordance with a representative embodiment of the present invention. The method of flowchart 400 will now be described with reference to the example VoIP telephony system 100 described above in reference to FIG. 1. However, persons skilled in the relevant art will readily appreciated that the invention may be implemented in any voice over packet system.

The method of flowchart 400 begins at step 410, in which an entity such as, for example, one of the VoIP telephones 126, 128 of FIG. 1 may determine packet network load by, for example, receiving messaging from an entity such as the network management entity 140, that monitors one or more parameters that are indicative of the amount of bandwidth currently being utilized on packet network 102. For example, network management entity 140 may monitor parameters such as an amount of traffic being handled by network elements (such as gateways, routers and servers) or a number of active calls being handled by call control entity such as the call control entity 150 in order to ascertain the level of bandwidth usage. In the alternative, as discussed above with respect to FIG. 3, it may be evident from a historical perspective that during certain times of day (e.g., evenings) and certain days of the week (e.g., weekends), network load (i.e., bandwidth utilization) on packet network 102 is significantly less than at other times (e.g., weekdays during business hours). Thus, in one representative embodiment of the present invention, the network management entity 140 may monitor what the time of day is and/or what day of the week it is in order to obtain an indication of the amount of bandwidth currently being utilized on packet network 102. The network management entity 140 may notify other elements of a packet network such as, for example, the packet network 102, of current or historical network loading or bandwidth utilization, to permit such devices to select appropriate voice over packet operating characteristics. The notification may be sent, for example, to a call control entity such as the standalone call control entity 150 of FIG. 1, or to another network element that performs the functions of the call control entity 150. The call control entity 150, for example, may use such information to select an appropriate voice packet size, and may notify elements such as the gateways 110, 112 or VoIP telephones 126, 128 of the voice packet size to be employed. As discussed above, a variety of parameters may be monitored that are indicative of the amount of bandwidth currently being utilized on packet network 102 as will be appreciated by persons skilled in the art. It should also be clear that the network management entity 140 and call control entity 150 need not be separate, standalone elements, and need not be located as shown in the exemplary network architecture shown in FIG. 1. The functions performed may be combined within other network entities and positioned in other locations in various ways within the VoIP telephony system 100 such as, for example, within a gateway or telephone such as, for example, the gateways 110, 112 or the VoIP telephones 126, 128, without departing from the scope of the present invention.

Referring once again to FIG. 4, at step 412, the network management entity 140 may, for example, set an initial voice packet size based on bandwidth utilization in the packet network 102. At step 414, a packet voice terminal such as, for example, the VoIP telephones 126, 128 may determine whether a check of packet network load (i.e., bandwidth utilization) should be performed. If it is determined that it is time to check packet network load then in one representative embodiment of the present invention, at step 416, information received from a packet network entity such as, for example, the network management entity 140 may be used to estimate the level of bandwidth utilization. Then, at step 418, a determination may be made whether the current voice packet size is appropriate for the packet network load. This determination may employ information from a network entity such as the network management entity 140, regarding an appropriate voice packet size. For example, network management entity 140 and/or call control entity 150 may determine that the level of bandwidth utilization has decreased or increased based on a change in the amount of traffic being handled by network elements or a change in the number of active calls being handled by call control entity 150. In another representative embodiment of the present invention, the network management entity 140 and/or the call control entity 150 may determine that the level of bandwidth utilization has decreased or increased based on reaching a certain time of day or day of the week. The network management entity 140 and/or call control entity 150 may determine that a smaller or larger voice packet size is appropriate based upon the observed packet network bandwidth utilization or load. In a representative embodiment of the present invention, information about packet network load or bandwidth utilization, or a preferred voice packet size may be communicated to other elements within the packet network such as, for example, the gateways 110, 112 or VoIP telephones 126, 128. As previously noted, a large number of network parameters may be selected for monitoring to make this determination and a decision on voice packet size, as will be appreciated by persons skilled in the art.

If, at step 418, it is determined that the current voice packet size is appropriate, a network entity such as the gateways 110, 112 or the VoIP telephones 126, 128 may continue without a change in voice packet size. In that case, at step 422, a voice packet terminal such as the VoIP telephones 126, 128, for example, may continue to collect digitized voice information. At step 424, the VoIP telephones 126, 128 may packetize outgoing digitized voice information according to the current voice packet size and, at step 426, the VoIP telephones 126, 128 may transmit the outgoing voice packet to the far end party. At step 428, a determination may be made as to whether the voice call has ended. If the voice call has ended, the method of FIG. 4 ends. If, however, the voice call has not ended, the method of FIG. 4 loops back to step 414, to again determine whether it is time for a check of packet network load (i.e., bandwidth utilization), and the process continues as described above.

If, however, the test at step 418 determines that the current voice packet size is not appropriate then, at step 420, the VoIP telephones 126, 128, for example, may adjust the voice packet size to be used, based upon the information about packet network load or voice packet size determined by the network management entity 140, the call control entity 150, or that one or both of the VoIP telephones 126, 128 may have determined. If a network entity such as the network management entity 140 and/or call control entity 150, the gateways 110, 112, or the VoIP telephones 126, 128, determines that a change in voice packet size is appropriate, that network entity may communicate information to cause such a change to the other elements taking part in the voice call. Following adjustment of the voice packet size, at step 420, the VoIP telephones 126, 128, for example, then continue with the processing of digitized voice information, using the newly adjusted voice packet size, as described above beginning at step 422.

Figure 5:
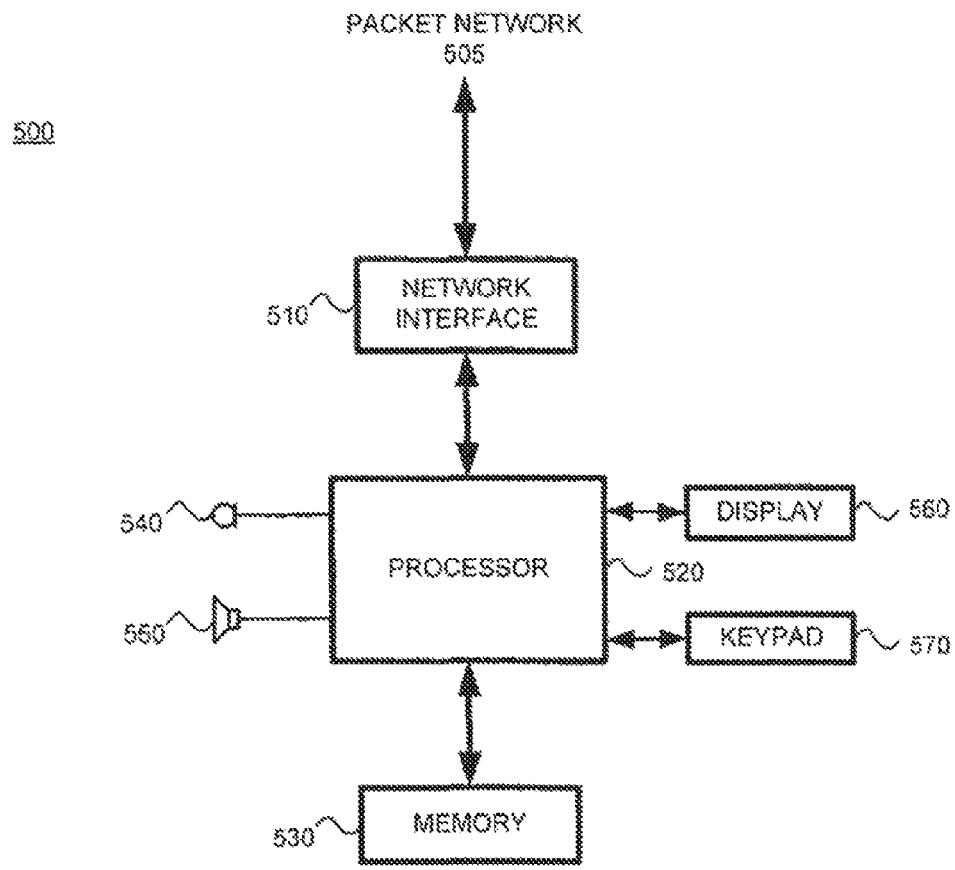
FIG. 5 is a block diagram illustrating an exemplary VoIP telephone in which a representative embodiment of the present invention may be practiced.

FIG. 5 is a block diagram illustrating the architecture of an exemplary VoIP telephone 500 in which a representative embodiment of the present invention may be practiced. The VoIP telephone 500 of FIG. 5 may correspond to, for example, the VoIP telephones 126, 128 of FIG. 1. As shown in FIG. 5, the VoIP telephone 500 comprises a processor 520, a network interface 510, a memory 530, a microphone/transmitter 540, a speaker/receiver 550, a display 560, and a keypad 570. The processor 520 may comprise, for example, a general purpose or digital signal processor such as those available from numerous vendors, or present in signal and packet processing devices such as those made by Broadcom Corporation. The network interface 510 operably couples the processor 520 to a packet network such as, for example, the packet network 102 of FIG. 1, that may comprise a wired or wireless packet-based network using IEEE 802.3, IEEE 802.11a/b/g/n, IEEE 802.16, and IEEE 802.15.3 a standards, for example.

The memory 530 is operably coupled to the processor 520, and may comprise any of suitable random access, read-only and/or read-write memory such as, for example, static or dynamic RAM, ROM, EPROM, EEROM, EAROM, and suitable types of flash memory, to name only a few examples. The memory 530 may, for example, be used to store executable code, packets, operating parameters, and the like. For example, the memory 530 may contain executable instructions for causing the processor 520 to perform the steps in the exemplary methods shown in FIGS. 3 and 4.

Sound may be converted to analog electrical signals by microphone/transmitter 540 and converted to digital form by the processor 520, or by circuitry (not shown) that is operably coupled to the processor 520. In a complementary fashion, digital information representing audio signals may be converted to analog electrical signals by the processor 520 or by circuitry (not shown) operably coupled to the processor 520, and routed to the speaker/receiver 550 for conversion to sound.

The display 560 may be used to provide feedback and instruction to a user of the VoIP telephone 500 from the processor 520, while user input may be captured by keypad 570 for processing by the processor 520.

Figure 6:
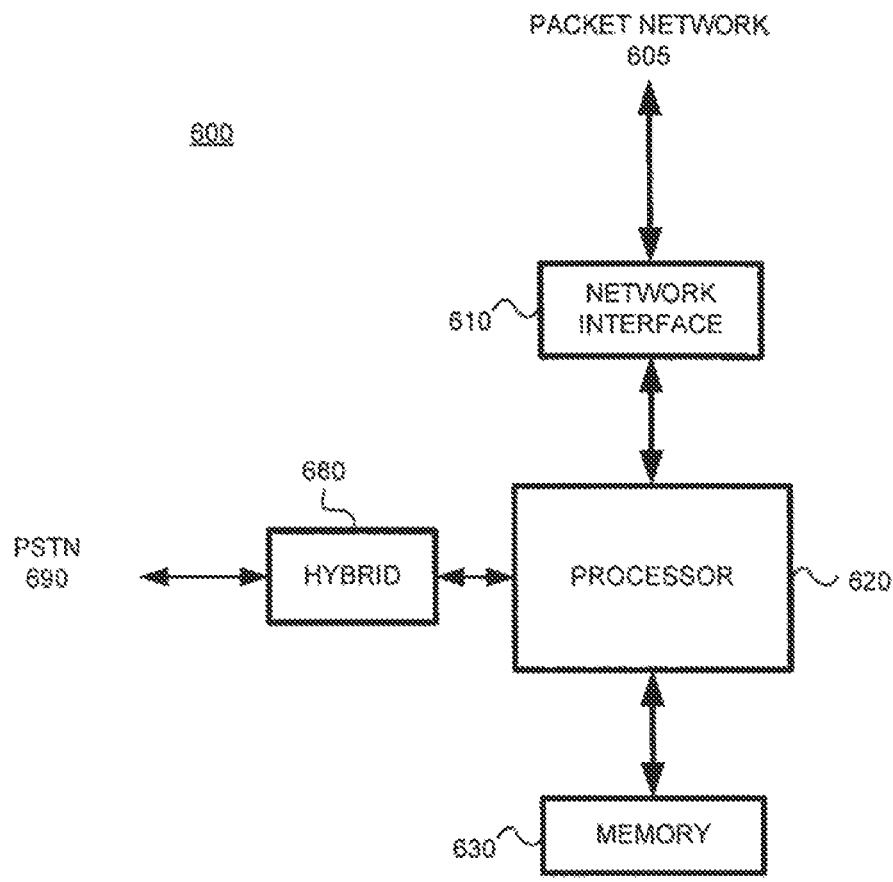
FIG. 6 is a block diagram illustrating an exemplary gateway that may correspond to, for example, the gateways of FIG. 1, in accordance with a representative embodiment of the present invention.

FIG. 6 is a block diagram illustrating the architecture of an exemplary gateway 600 that may correspond to, for example, the gateways 110, 112 of FIG. 1, in accordance with a representative embodiment of the present invention. As shown in FIG. 6, the gateway 600 comprises a processor 620, a network interface 610, a memory 630, and a hybrid 690. The processor 620 may comprise, for example, a general purpose or digital signal processor such as those available from numerous vendors, or present in signal and packet processing devices such as those made by Broadcom Corporation.

The network interface 610 operably couples the processor 620 to a packet network such as, for example, the packet network 102 of FIG. 1, that may comprise a wired or wireless packet-based network using IEEE 802.3, IEEE 802.11a/b/g/n, IEEE 802.16, and IEEE 802.15.3a standards, for example.

The memory 630 is operably coupled to the processor 620, and may comprise any of suitable random access read-only and/or read-write memory such as, for example, static or dynamic RAM, ROM, EPROM, EEROM, EAROM, and suitable types of flash memory, to name only a few examples. The memory 630 may, for example, be used to store executable code, packets, operating parameters, and the like. For example, the memory 630 may contain executable instructions for causing the processor 620 to perform the steps in the exemplary methods shown in FIGS. 3 and 4.

The hybrid 680 functions to operably couple audio frequency electrical signals to/from the public switched telephone network (PSTN) analog line 690. Voice packets comprising voice frames containing digitized audio information (e.g., digitized voice) are received by the processor 620 from the packet network 605 via the network interface 610. The voice packets are depacketized into digital voice data that is converted to analog electrical signals by the processor 620, or by circuitry (not shown) that is operably coupled to the processor 620. In a complementary fashion, analog electrical signals received from the PSTN 690 via hybrid 680 are converted to digital form by the processor 620, or by circuitry (not shown) that is operably coupled to the processor 620. The processor 620 then assembles the digital voice data into voice frames that are placed into voice packets, which are transmitted to packet network 605 via network interface 610.

Although the illustrations of FIGS. 5 and 6 show a number of individual elements performing the functions described above, this is only for purposes of illustration and clarity, and does not represent specific limitations of the present invention. The illustrated elements of FIGS. 5 and 6 may be combined into various groupings of functionality and in various ways to perform the functions described above, without departing from the scope of the present invention.

Various representative embodiments of the present invention may be used to reduce the end-to-end delay associated with telephone calls placed over a voice over packet network, such as a VoIP network, without resulting in overloading of the network or requiring increased network capacity. In particular, a system and method in accordance with the present invention permits a small frame size and packet size to be used for transmitting voice packets over the network in a manner that does not cause overloading of the network of require increased network capacity.

An embodiment of the present invention operates by adaptively using a reduced packet size for a VoIP telephone call during periods of low network bandwidth utilization and using an increased packet size during periods of high network bandwidth utilization. By adaptively reducing the packet size, an embodiment of the present invention decreases the amount of encoded data that must be accumulated and packetized prior to transmission over a packet network, which in turn reduces the end-to-end delay associated with a VoIP telephone call. However, reducing the packet size also results in packets having disproportionately large headers, such that a large amount of transmission bandwidth is consumed or "wasted" transporting packet header information rather than encoded speech. An embodiment of the present invention addresses this issue by only reducing the packet size when bandwidth utilization on a packet network is determined to have decreased by a certain amount or to a particular level, such that this consumption of transmission bandwidth can be readily accommodated by the network.

By adaptively increasing the packet size, an embodiment of the present invention avoids generating packets with disproportionately large headers, such that a large amount of transmission bandwidth is not "wasted" transporting packet header information rather than encoded speech. However, increasing the packet size in this manner increases the amount of encoded data that must be accumulated and packetized prior to transmission over a packet network, which in turn increases the end-to-end delay associated with a VoIP telephone call. An embodiment of the present invention addresses this issue by only increasing packet size when bandwidth utilization on the packet network is determined to have increased by a certain amount or to a particular level, such that avoiding unnecessary consumption of transmission bandwidth is deemed a greater priority than preventing end-to-end delay for VoIP telephone calls.

A method in accordance with an embodiment of the present invention includes monitoring one or more parameters indicative of an amount of bandwidth being utilized on the voice over packet network, responsive to the monitoring, determining that a level of bandwidth utilization on the voice over packet network has changed, responsive to the determination that the level of bandwidth utilization on the voice over packet network has changed, issuing a command to a telephony device, and responsive to receipt of the command by the telephony device, changing the size of packets used for carrying frames of encoded voice signals associated with a telephone call from a first packet size to a second packet size.

A system in accordance with an embodiment of the present invention includes a network monitoring entity and a call control entity. The network monitoring entity is configured to monitor one or more parameters indicative of the amount of bandwidth being utilized on a voice over packet network, to determine that a level of bandwidth utilization on the voice over packet network has changed responsive to the monitoring, and to issue a notification responsive to the determination that the level of bandwidth utilization on the voice over packet network has changed. The call control entity is configured to receive the notification and to change the size of packets used for carrying frames of encoded voice signals associated with a telephone call from a first packet size to a second packet size responsive to the receipt of the notification.

An alternative system in accordance with an embodiment of the present invention includes a network monitoring entity and a telephony device. The network monitoring entity is configured to monitor one or more parameters indicative of the amount of bandwidth being utilized on a voice over packet network, to determine that a level of bandwidth utilization on the voice over packet network has changed responsive to the monitoring, and to issue a command responsive to the determination that the level of bandwidth utilization on the voice over packet network has changed. The telephony device is configured to receive the command and to change the size of packets used for carrying frames of encoded voice signals associated with a telephone call from a first packet size to a second packet size responsive to the receipt of the command.

Aspects of the present invention may be seen in a method for minimizing end-to-end delay associated with calls carried over a packet network in a manner that avoids overloading of the packet network. Such a method may comprise monitoring one or more parameters indicative of an amount of bandwidth being utilized on a relatively larger first portion of the packet network, and responsive to the monitoring, determining that a level of bandwidth utilization on the relatively larger first portion of the packet network has changed. The method may also comprise, responsive to the determination that the level of bandwidth utilization on the relatively larger first portion of the packet network has changed, issuing at least one command to each of a plurality of devices in a relatively smaller second portion of the packet network. In a representative embodiment of the present invention, the command may cause at least the plurality of devices in the relatively smaller second portion of the packet network to change the size of packets used for carrying frames of encoded signals associated with a call from a first packet size to a second packet size.

In some representative embodiments of the present invention, monitoring one or more parameters indicative of the amount of bandwidth being utilized on the relatively larger first portion of the packet network may comprise monitoring an amount of traffic being handled by elements of the relatively larger first portion of the packet network. In some representative embodiments, monitoring one or more parameters indicative of the amount of bandwidth being utilized on the relatively larger first portion of the packet network may comprise monitoring a number of active calls being handled by a call control entity. Monitoring one or more parameters indicative of the amount of bandwidth being utilized on the relatively larger first portion of the packet network may comprise monitoring the time of day, and may comprise monitoring the day of the week.

In a representative embodiment of the present invention, determining that the level of bandwidth utilization has changed may comprise determining that the level of bandwidth utilization has decreased, and changing the size of packets used for carrying frames of encoded signals associated with a call from a first packet size to a second packet size may comprise reducing the packet size. Reducing the packet size may comprise reducing a payload of encoded voice signals carried by each packet from one of 10, 20 or 30 milliseconds to 5 milliseconds. Determining that the level of bandwidth utilization has changed may also comprise determining that the level of bandwidth utilization has increased, and changing the size of packets used for carrying frames of encoded signals associated with a call from a first packet size to a second packet size may comprise increasing the packet size. Increasing the packet size may comprise increasing a payload of encoded voice signals carried by each packet from 5 ms to one of 10, 20 or 30 milliseconds.

In a representative embodiment of the present invention, issuing at least one command to a plurality of devices may comprise issuing a command to one of a telephone or a gateway, and may comprise transmitting a notification to a call control entity, the notification causing the call control entity to issue the at least one command to the plurality of devices. In some representative embodiments of the present invention, the packet network may comprise a voice over packet network.

Other aspects of the present invention may be observed in a system comprising a network monitoring entity. The network monitoring entity may be configured to monitor one or more parameters indicative of the amount of bandwidth being utilized on a relatively larger first portion of a packet network, to determine, responsive to the monitoring, that a level of bandwidth utilization on the relatively larger first portion of the packet network has changed. The network monitoring entity may also be configured to issue a notification responsive to the determination that the level of bandwidth utilization on the relatively larger first portion of the packet network has changed. The system may also comprise a call control entity configured to receive the notification and to change the size of packets used for carrying frames of encoded signals associated with a call in a relatively smaller second portion of the packet network from a first packet size to a second packet size responsive to the receipt of the notification. The one or more parameters indicative of the amount of bandwidth being utilized on the relatively larger first portion of the packet network may include an amount of traffic being handled by elements of the packet network, and may include a number of active calls being handled by the call control entity. The one or more parameters indicative of the amount of bandwidth being utilized on the relatively larger first portion of the packet network may include the time of day, and may include the day of the week.

In a representative embodiment of the present invention, the network monitoring entity may be configured to determine that the level of bandwidth utilization has decreased, and to issue the notification responsive to the determination that the level of bandwidth utilization has decreased. The call control entity may be configured to reduce the size of packets used for carrying frames of encoded voice signals associated with a telephone call responsive to receipt of the notification. The call control entity may be configured to reduce the size of packets used for carrying frames of encoded voice signals associated with a telephone call by reducing a payload of encoded voice signals carried by each packet from one of 10, 20 or 30 milliseconds to 5 milliseconds. The network monitoring entity may also be configured to determine that the level of bandwidth utilization has increased, and to issue the notification responsive to the determination that the level of bandwidth utilization has increased. The call control entity may be configured to increase the size of packets used for carrying frames of encoded voice signals associated with a telephone call responsive to receipt of the notification. The call control entity may be configured to increase the size of packets used for carrying frames of encoded voice signals associated with a telephone call by increasing a payload of encoded voice signals carried by each packet from 5 ms to one of 10, 20 or 30 milliseconds.

A system in accordance with the present invention may comprise one or more telephony devices, and the call control entity may be configured to issue a call control command to the one or more telephony devices to change the size of packets used for carrying frames of encoded voice signals associated with a telephone call from a first packet size to a second packet size. The one or more telephony devices may comprise at least one of a telephone or a gateway. The packet network may comprise a voice over packet network.

Yet other aspects of the present invention may be found in a system comprising a network monitoring entity configured to monitor one or more parameters indicative of the amount of bandwidth being utilized on a relatively larger first portion of a packet network. The network monitoring entity may be configured to determine, responsive to the monitoring, that a level of bandwidth utilization on the relatively larger first portion of the packet network has changed, and to issue a command responsive to the determination that the level of bandwidth utilization on the relatively larger first portion of the packet network has changed. The system may also comprise a device configured to receive the command and to change the size of packets used for carrying frames of encoded signals associated with a call in a relatively smaller second portion of the packet network from a first packet size to a second packet size responsive to the receipt of the command. The device may comprise one of a telephone or a gateway, and the packet network may comprise a voice over packet network.

Still other aspects of the present invention may be seen in one or more circuits for reducing end-to-end delay over a voice over packet network in a manner that avoids overloading of the packet network. The one or more circuits may comprise at least one interface for exchanging voice packets over the voice over packet network, where a number of voice frames may be contained in each voice packet. The one or more circuits may also comprise at least one processor operably coupled to the at least one interface, the at least one processor operable to determine bandwidth utilization of a relatively larger first portion of the voice over packet network, and select a number of voice frames to be placed in each voice packet based upon the determined bandwidth utilization. The at least one processor may also be operable to assemble a voice packet containing the selected number of voice frames, and transmit the assembled voice packet over a relatively smaller second portion of the packet network via the at least one interface. The determining may comprise receiving the number of voice frames to be placed in each voice packet, via the at least one interface, monitoring one or more parameters indicative of an amount of bandwidth being utilized by the relatively larger first portion of the packet network, and selecting the number of voice frames to be placed in each voice packet, based upon the one or more parameters. The one or more parameters may comprise one or more of the following: an amount of traffic being handled by certain elements of the relatively larger first portion of the packet network, a number of active voice calls being handled by a call control entity, a level of bandwidth usage by the relatively larger first portion of the packet network, a time of day, and a day of the week.

Accordingly, the present invention may be realized in hardware, software, or a combination of hardware and software. The present invention may be realized in a centralized fashion in at least one computer system, or in a distributed fashion where different elements are spread across several interconnected computer systems. Any kind of computer system or other apparatus adapted for carrying out the methods described herein is suited. A typical combination of hardware and software may be a general-purpose computer system with a computer program that, when being loaded and executed, controls the computer system such that it carries out the methods described herein.

The present invention may also be embedded in a computer program product, which comprises all the features enabling the implementation of the methods described herein, and which when loaded in a computer system is able to carry out these methods. Computer program in the present context means any expression, in any language, code or notation, of a set of instructions intended to cause a system having an information processing capability to perform a particular function either directly or after either or both of the following: a) conversion to another language, code or notation; b) reproduction in a different material form.

While the present invention has been described with reference to certain embodiments, it will be understood by those skilled in the art that various changes may be made and equivalents may be substituted without departing from the scope of the present invention. In addition, many modifications may be made to adapt a particular situation or material to the teachings of the present invention without departing from its scope. Therefore, it is intended that the present invention not be limited to the particular embodiment disclosed, but that the present invention will include all embodiments falling within the scope of the appended claims.

What is claimed is:

1. A method, comprising:
monitoring one or more network parameters in a packet network by a network monitoring entity, the one or more network parameters indicating a level of bandwidth utilization in at least a first portion of the packet network and being based on a plurality of data transmissions in at least the first portion of the packet network, the first portion of the packet network including a first end-to-end data transmission path; and
issuing a command to modify a packet size property associated with one or more data packets of an active data transmission in a second portion of the packet network responsive to monitoring the one or more network parameters, the second portion of the packet network including a second end-to-end data transmission path that includes at least one end point that is different from the first end-to-end data transmission path.

2. The method of claim 1, further comprising:
receiving an indication of bandwidth utilization in the first portion of the packet network from the network monitoring entity at a network controlling entity or a network management entity;
wherein issuing the command to modify the packet size property is performed by the network controlling entity or the network management entity.

3. The method of claim 2, wherein issuing the command by the network controlling entity or the network management entity is based on at least one of:
a determination of a change in the level of bandwidth utilization in the first portion of the packet network by a first amount, or
a determination of a change in the level of bandwidth utilization in the first portion of the packet network by a second amount such that the changed level of bandwidth utilization exceeds or drops below a threshold value.

4. The method of claim 3, wherein monitoring the one or more network parameters comprises monitoring one or more measures, the one or more measures including at least one of a voice quality measure, an end-to-end delay measure, or a network bandwidth utilization measure.

5. The method of claim 4, wherein at least one of the one or more measures is weighted or limited by a system operator.

6. The method of claim 1, wherein at least one of the one or more data packets is a media data packet comprising one of voice data, video data, or multi-media data.

7. The method of claim 6, wherein the media data packet comprises a portion of a real-time data stream.

8. The method of claim 1, wherein monitoring the one or more network parameters comprises monitoring historical data about past network usage over one or more time periods.

9. A system, comprising:
a network monitoring entity configured to monitor at least one packet network parameter based on a plurality of data transmissions, the at least one packet network parameter being indicative of a level of bandwidth utilization in at least a first portion of a packet network, the first portion of the packet network including a first end-to-end data transmission path; and
a command issuance entity configured to issue a command to modify a packet size property associated with one or more data packets of an active data transmission in a second portion of the packet network responsive to the monitoring of the at least one packet network parameter, the second portion of the packet network including a second end-to-end data transmission path that includes at least one end point that is different from the first end-to-end data transmission path.

10. The system of claim 9, wherein the command issuance entity is configured to:
receive an indication of bandwidth utilization in the first portion of the packet network from the network monitoring entity; and
issue the command to modify the packet size property;
wherein the command issuance entity is one of a network controlling entity or a network management entity.

11. The system of claim 10, wherein the command issuance entity is further configured to issue the command based on performing at least one of:
determining a change in the level of bandwidth utilization in the first portion of the packet network by a first amount, or
determining a change in the level of bandwidth utilization in the first portion of the packet network by a second amount such that the changed level of bandwidth utilization exceeds or drops below a threshold value.

12. The system of claim 9, wherein the network monitoring entity is further configured to monitor the one or more network parameters by monitoring one or more measures, the one or more measures including at least one of a voice quality measure, an end-to-end delay measure, or a network bandwidth utilization measure.

13. The system of claim 12, wherein at least one of the one or more measures is weighted or limited by a system operator.

14. The system of claim 9, wherein the command issuance entity is further configured to issue the command to modify the packet size property of a media data packet comprising one of voice data, video data, or multi-media data.

15. The system of claim 9, wherein the command issuance entity is further configured to modify the packet size property of a media data packet that includes a portion of a real-time data stream.

16. The system of claim 9, wherein the network monitoring entity is further configured to monitor the one or more network parameters by monitoring historical data about past network usage over one or more time periods.

17. A communication device, comprising:
a receiver configured to receive a command to change data packets in a data transmission in a first portion of a packet network from a first packet size to a second packet size,
the command being received from a network entity in the packet network, and the command being based on an indication of a level of bandwidth utilization in at least a second portion of the packet network that is based on a plurality of data transmissions in at least the second portion, the first portion of the packet network including a first end-to-end data transmission path, and the second portion of the packet network including a second end-to-end data transmission path that includes at least one end point that is different from the first end-to-end data transmission path; and a transmitter configured to:
  transmit one or more data packets having the first packet size in the data transmission, and
  modify the data transmission to include at least one data packet having the second packet size in response to the receiver receiving the command.

18. The communication device of claim 17, wherein the one or more data packets transmitted by the transmitter include one of voice data, video data, or multi-media data.

19. The communication device of claim 18, wherein the one or more data packets transmitted by the transmitter include data from a real-time data stream.

20. The communication device of claim 17, wherein the transmitter is configured to:
  modify the data transmission to include at least one data packet having the second packet size, where the second packet size is smaller than the first packet size, in response to the receiver receiving the command indicating a decrease in the level of bandwidth utilization in at least the second portion; and
  modify the data transmission to include at least one data packet having the second packet size, where the second packet size is larger than the first packet size, in response to the receiver receiving the command indicating an increase in the level of bandwidth utilization in at least the second portion.

* * * * *